United States Patent [19]

Berchtold

[11] 3,948,785
[45] Apr. 6, 1976

[54] PROCESS OF MANUFACTURING FERRITE MATERIALS WITH IMPROVED MAGNETIC AND MECHANICAL PROPERTIES

[76] Inventor: Jean Berchtold, 8185 Prestwick Drive, La Jolla, Calif. 92037

[22] Filed: May 18, 1973

[21] Appl. No.: 361,697

Related U.S. Application Data

[63] Continuation of Ser. No. 103,480, Jan. 4, 1971, abandoned.

[52] U.S. Cl. .............................. 252/62.62; 423/594
[51] Int. Cl.$^2$ .................... C04B 35/30; C04B 35/38
[58] Field of Search ....... 252/62.56, 62.62; 423/594

[56] References Cited
UNITED STATES PATENTS

| | | | |
|---|---|---|---|
| 3,027,327 | 3/1962 | Blank | 252/62.62 |
| 3,043,777 | 7/1962 | Lessoff et al. | 252/62.62 |
| 3,189,550 | 6/1965 | Malinofsky | 252/62.62 X |
| 3,252,913 | 5/1966 | Van Gils et al. | 252/62.62 |
| 3,472,780 | 10/1969 | Stuijts | 252/62.62 |
| 3,483,126 | 12/1969 | Sara et al. | 252/62.62 X |
| 3,542,685 | 11/1970 | Iwase et al. | 252/62.62 |
| 3,565,806 | 2/1971 | Ross | 252/62.62 |
| 3,574,114 | 4/1971 | Monforte | 252/62.62 X |
| 3,645,898 | 2/1972 | Klerk et al. | 252/62.62 X |
| 3,778,374 | 12/1973 | Shichijo et al. | 252/62.62 |

*Primary Examiner*—Jack Cooper

[57] ABSTRACT

A process for preparing ferromagnetic ferrite powder is disclosed. According to this process, solid ferrite forming metal compounds are calcined and subsequently sintered while the oxygen content of the ambient atmosphere is controlled to maintain the oxygen content of the ferrite substantially stoichiometric throughout the process. As disclosed herein, metal oxides can be used as the ferrite forming metal compounds and the oxygen in the ambient atmosphere can be controlled during calcining and sintering by using a flowing stream of nitrogen gas containing 0 to about 1%, by volume, of oxygen. Ferromagnetic ferrite powders obtained by this process exhibit substantially uniform mircostructures and oxygen contents which are substantially stoichiometric. Examples of ferrite powders which are prepared by the process include manganese zinc ferrite and nickel zinc ferrite.

10 Claims, 2 Drawing Figures

PROCESS OF MANUFACTURING FERRITE MATERIALS WITH IMPROVED MAGNETIC AND MECHANICAL PROPERTIES

This application is a Continuation of application Ser. No. 103,480, filed Jan. 4, 1971, entitled "Process of Manufacturing Ferrite Materials With Improved Magnetic and Mechanical Properties", now abandoned.

BACKGROUND OF THE INVENTION

1. Field of the Invention

This invention relates to processes of manufacturing soft magnetic material of improved mechanical and magnetic properties suitable for use as magnetic recording heads, to such material and to magnetic recording heads produced from such material.

2. The Terminology Used in the Specification

Units in the following are metric and abbreviations conform to the International System of Units (SI). In addition, the following popular symbols and their corresponding meanings are used in the text:

| | |
|---|---|
| $\mu i$ | initial permeability at low frequency |
| $\mu i(f10)$ | initial permeability at 10 MHz |
| $f(Q1)$ | frequency where $Q = 1$ |
| Hc | coercivity (oersteds) |
| Pv | visual porosity in percent of visual pore area to total field area evident on a polished microscopic sample at a magnification of 500x. |
| min | minute |
| h | hour |
| d | day |
| torr | pressure of column of 1 mm of mercury |

DESCRIPTION OF THE PRIOR ART

Manganese zinc ferrite and nickel zinc ferrite are most commonly produced by a ceramic process involving the following steps:

1. Oxides of the respective metals are first blended in a ratio according to the desired composition and milled.

2. The resulting oxide mixture is subjected to a thermal treatment called calcining wherein ferrite material is synthesized by a solid state reaction. Generally this step is performed in air and only a partial ferrite formation is accomplished. In the case of manganese zinc ferrite, non-reacted higher oxides of manganese ($Mn_3O_4$ & $Mn_2O_3$) and hematite ($Fe_2O_3$) are present in substantial amounts in the calcined product. As explained later herein this foreign phase and the excess in oxygen level over that of the stoichiometric value is not desirable for producing high quality ferrites.

3. The calcined material thus obtained is then milled in order to reduce its particle size and to homogenize the material. This step is commonly performed in a steel ball mill. From this operation, however, the ferrite material becomes contaminated with loose iron particles shed from the mill charge. Although the increase in iron content can easily be compensated for in the initial formulation, this elementary iron is a non-desirable reducing agent, detrimental to the homogeneity of the final product as will be shown later herein.

4. An organic binder is usually added at this stage in order to better control subsequent steps of granulating or spray drying and pressing. Again this contamination is a source of problems such as will be evident later herein.

5. In the preliminary stage of the sintering process, the pressed ferrite part is subjected to an oxidizing treatment. The aim is to get rid of the organic binder added previously, which at this stage is burned off by heating the ferrite part in air. From the reaction with the organic binder and the elemental iron, the ferrite material is first locally reduced, in particular at a location remote from the outside atmosphere, and at a later stage the ferrite is reoxidized. Since it is mandatory to remove the reducing compounds (which are herein referred to as deleterious reducing contaminants) completely, an over-oxidation of the manganese zinc ferrite cannot be avoided.

6. At a later stage of the sintering process a so-called soak period is introduced with the aim to restore the oxygen stoichiometry, wherein the ferrite part is kept at a high temperature in an atmosphere deficient in oxygen with respect to that of the stoichiometric ferrite.

The drawbacks resulting from the various deviations of oxygen stoichiometry in either direction of the various steps of manufacturing according to the present state of the art will be evident in the following.

Low loss manganese zinc ferrite can be described as a solid solution of manganese ferrite $MnO.Fe_2O_3$, zinc ferrite $ZnO.Fe_2O_3$ and ferrous ferrite, or magnetite $FeO.Fe_2O_3$. The oxygen balance is critical since either an excess or a deficiency of oxygen will produce a chemical reaction and cause the breakdown of the ferrite. As illustrative of the chemical implication of such deviation from the oxygen stoichiometry, the following phase transformations which can occur with manganese zinc ferrite are mentioned:

A slight stoichiometric oxygen excess will oxidize the magnetite content of the ferrite to hematite:

$$FeO.Fe_2O_3 + \frac{1}{4} O_2 \rightarrow 3/2\ Fe_2O_3$$

A stronger oxidation will also attack the manganese ferrite content:

$$MnO.Fe_2O_3 + 1/6\ O_2 \rightarrow \frac{1}{3} Mn_3O_4 + Fe_2O_3$$

Oxidation to higher valency states of the manganese are also possible under more severe oxidizing conditions, as for instance to $Mn_2O_3$ or $MnO_2$.

A loss of oxygen on the other side results from the dissociation of the zinc ferrite content under conditions where oxygen is deficient or under reducing conditions:

$$ZnO.Fe_2O_3 \rightarrow Zn \nearrow + \frac{1}{2} O_2 \nearrow + Fe_2O_3$$

Since the elemental zinc produced has a substantial vapor pressure at temperatures encountered during sintering, it evaporates readily. (Zinc has a boiling point of 907° C. at atmospheric pressure). The resulting compositional change disturbs the ferrite structure in a non-reversible manner.

Analogous reactions can occur with other types of ferrites, for instance with nickel zinc ferrite where a smaller amount of cobalt is either deliberately added for reducing the magnetocrystalline anisotropy or is present as an impurity in the nickel source material.

The cobalt ferrite content can be oxidized as follows:

$$CoO.Fe_2O_3 + 1/6\ O_2 \rightarrow \frac{1}{3} Co_3O_4 + Fe_2O_3$$

The practical implications to a non-homogeneous microstructure resulting from a foreign phase within the ferrite are numerous. Since the chemical composition is changed from its optimum value, properties are altered. The inclusions due to a foreign phase create effects similar to those of pores. They are the source of mechanical weak points due to stress concentration and make accurate machining impossible. Wear properties of magnetic heads manufactured from such ferrite suffer for the same reason. Magnetic properties are also degraded from non-magnetic inclusion, resulting in an increased loss factor, increased coercivity and a decreased permeability.

However, even a small spacial fluctuation of the oxygen content or of the ionic composition without visible foreign phase can be the source of stresses generated in the material on a microscopic scale. Such stresses are produced from cationic or anionic vacancies causing a charge imbalance and steric disturbance of the crystal lattice. Also, since thermal expansion varies with composition, local variations in composition generate stresses from cooling from sinter temperature to room temperature. Under the effect of severe internal strain, ferrite bodies may fracture.

The described deleterious effects are of greater consequence with ferrite of low porosity (<0.2%). This is so because diffusion of oxygen is slowed down in a dense body, but also because the bulk modulus of elasticity of a dense body is higher than that of a porous body of the same material. Hence, a given distortion will produce a greater strain.

SUMMARY OF THE INVENTION

The present invention relates to the manufacturing of soft ferromagnetic oxides on the basis of manganese zinc ferrite and nickel zinc ferrite.

More particularly, the invention relates to improved manufacturing processes which prevent any significant deviation from the desired oxygen stoichiometry to occur at any step of manufacturing and most specifically during sintering.

The principal object of this invention is to provide means of producing ferrite with improved mechanical magnetic properties.

Another object of the invention is to provide ferrite bodies having a uniform microstructure, improved strength properties, improved resistance to abrasion and a reduced porosity.

A further object of the invention is to provide a ferrite with reduced loss factor, a reduced coercivity and an increased limit of useful frequency.

It is a further objective of the invention to provide ferrite bodies suitable for use as magnetic recording heads.

Other objects, features and advantages of the invention herein disclosed will be readily apparent from the following description of certain preferred embodiments thereof but variations and modifications may be effected without departing from the spirit and scope of the novel concepts of this disclosures.

BRIEF DESCRIPTION OF THE DRAWINGS

A preferred method of my invention is carried out using equipment such as illustrated in the accompanying drawings in which.

DESCRIPTION OF THE PREFERRED EMBODIMENTS

The invention relates to all steps of manufacturing where a divergence of stoichiometry can occur and describes means to prevent such divergence. These steps include calcining, milling, binder addition (viz. avoiding such addition) and a sintering operation employing an equilibrium atmosphere at all stages of the temperature cycle.

According to the invention, it has been found that any deviation of the oxidation level of the ferrite material during the manufacturing process is detrimental to the properties of the final product and needs to be avoided in order to produce ferrite material of low porosity, high mechanical strength and low magnetic losses.

In the preferred form of the invention, pure metal compounds are blended in the desired proportions and milled in an alumina ball mill (high density alumina jar and media) as a water slurry.

As an illustrative example, a composition A is prepared from the following amount of pure oxides:

| 1520 g. | $Fe_2O_3$ |
| 415 g. | $Mn_2O_3$ |
| 263 g. | $ZnO$ |

Composition B is prepared from the following amounts of pure compounds:

| 1380 g. | $Fe_2O_3$ |
| 528 g. | $Mn\ CO_3$ |
| 295 g. | $ZnO$ |

Composition C is prepared from the following amounts of pure oxides:

| 1460 g. | $Fe_2O_3$ |
| 248 g. | $NiO$ |
| 7 g. | $CoO$ |
| 489 g. | $ZnO$ |

Mixtures of the above compounds are milled for two hours with 3.5 liters of water in a 13-liter ball mill charged with 15 kg. alumina balls of from 10 to 20 mm. diameter. The slurry produced is dewatered by filtering with a Buchner-type funnel with vacuum.

A granulation is performed here for ease of handling the material through the calcining furnace. Granulation may be done by any of the common methods not requiring a binder. According to the preferred embodiment of the invention, the partially dewatered material is extruded with a screw extruder through a perforated plate. The extruded material so obtained is then dried, crushed and screened, and fractions containing particles between 0.5 and 4 mm. are retained for further processing.

Calcining is preferably performed as a continuous operation in order to ensure a high level of homogeneity of the oxygen content.

Figure 1:
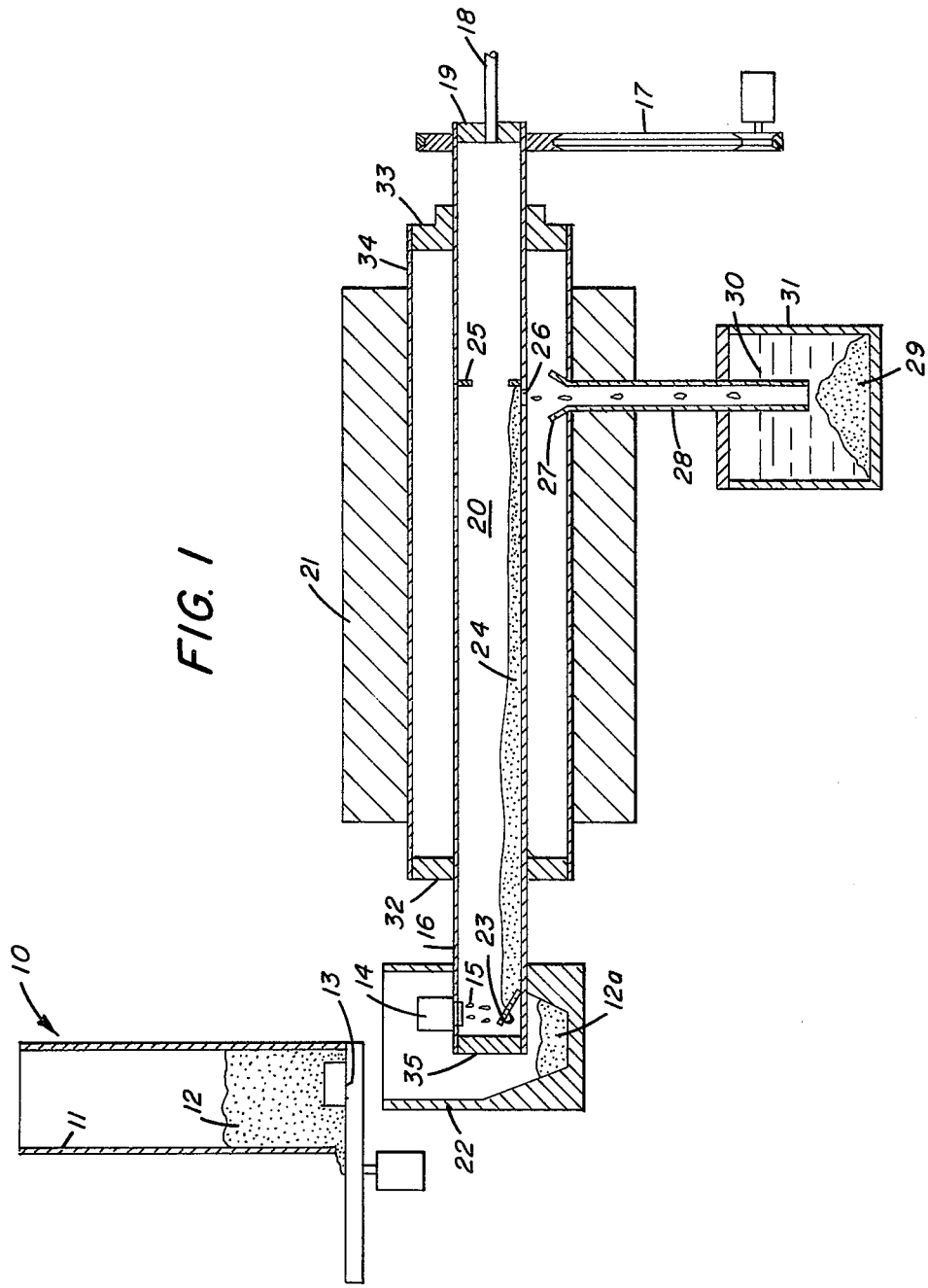
FIG. 1 shows a sectional view through a rotary kiln as used under the preferred method of the invention for calcining ferrite under well defined conditions of oxidation level.

With regard to FIG. 1, the reference numeral 10 indicates generally a feeding unit comprising a storage container 11 for containing the source material, which in this case is a mixture 12 of metal compounds. From the storage container 11, the mixture 12 is gravity discharged in metered amounts through a table feeder 13 into a lower stationary hopper 22, from which the mixture is fed, in a manner about to be described, into one end of a rotary ceramic tube 16. Said tube 16 constitutes a rotary kiln, being provided at its other end with a driving mechanism, indicated generally, by the reference number 17. A gas supply conduit 18 serves to feed a supply of the desired gas mixture axially through a rotary seal 19 into the interior 20 of said ceramic tube 16.

The tube 16 is surrounded by and supported within a stationary electrical tube furnace 21 that includes a muffle tube 34 coaxial with and of larger diameter than said tube 16. Rotary seals 32 and 33 seal the annular spaces between the ends of the tube 16 and the muffle tube 34. At its feed end the kiln is closed by a seal 35.

As the tube 16 is revolved, a scoop 14 picks up mixed compounds from the accumulation 12a of the mixture in the stationary hopper 22 and transfers them into the interior 20 of the tube 16 to fall in a stream 15 against a downwardly and forwardly sloping shelf 23. As the kiln revolves, the mixture falls off of the inclined shelf 23 and is subjected to a rotating and tumbling action that causes the mixture to spread out into an axially advancing layer 24 moving countercurrently with respect to the flow of gas from the inlet 18. An inner annular baffle 25 positioned toward the gas inlet end of the tube 20 causes the advancing layer 24 of the hot calcined oxide mixture to fall by gravity through an opening 26 provided upstream of the baffle in the wall of the tube and to pass downwardly into the flared upper end 27 of a down-chute 28. The chute 28 delivers the hot ferrite into a vessel 31 below the level 30 of a quenching liquid therein, which is usually water. The quenching liquid provides a gas seal. The quenched mixture builds up into a heap 29 below said level 30, from which the mixture is removed for further processing.

Typical numerical data for a rotary kiln such as described above are as follows:

| | |
|---|---|
| Inside diameter of calcine tube | 30 mm |
| Length of hot zone | 80 cm |
| Kiln inclination | 1:30 |

For the three above-mentioned compositions the following conditions were used:

| | A | B | C |
|---|---|---|---|
| Furnace temperature, °C | 1000 | 1050 | 1150 |
| Gas Composition | $N_2$ | $N_2 + 0.05\% O_2$ | $N_2 + 1\% O_2$ |
| Gas Flow Rate, l/min. | 2 | 2 | 1 |
| Speed of rotation, min.$^{-1}$ | 1 | 1 | 0.6 |
| Feed rate, kg/d | 2 | 2 | 1 |
| Effective Residence Time, h | 3 | 3 | 5 |

Because manganese is present as the sesqui-oxide in the starting material of composition A, this mixture exhibits an excess of oxygen over that required for the finished ferrite product. The gas composition chosen is pure nitrogen. Calcine conditions, in particular temperature, residence time and gas flow rate are chosen empirically such that oxygen is given off in the desired amount to yield a stoichiometric ferrite without zinc loss.

Compositions B and C do not require the removal of excess oxygen; hence a small content of oxygen is provided in the atmosphere to counteract zinc dissociation. As mentioned above, the calcined material is discharged into water, which furnishes a convenient gas seal. The calcined material is strained and fractured by the thermal shock produced by the quenching in water. The action, of course, is due to the thermal expansion change obtained from the sharp temperature differential. The introduction of stresses at this point is useful as it makes the subsequent milling operation more efficient and reduces contamination level from milling.

The ferrite granules obtained from the calcining operation are milled in an alumina ball mill to a maximum particle size of 5–10 $\mu$. Milling is performed upon a water slurry of the ferrite granules without addition of any binder, surfactant or viscosity modifier as is currently customary in the art.

The alumina pickup from the mill can be kept to such a very low level typically under 0.5% as to be of no practical consequence to the ferrite properties. It is, of course, desirable to keep the alumina content small since its addition will reduce the saturation magnetization of the ferrite by displacing a corresponding amount of ferric ion. It is advisable to reduce the iron content of the initial formulation by that amount on a mol basis in order to maintain stoichiometry.

The milled material is dewatered, preferably by filtering and drying. The filter cake is then crushed, screened and pressed into parts of the desired shape in a die as required, for instance, by using a hydraulic piston press or an isotatic press.

The ferrite slugs obtained are then sintered according to the invention under conditions maintaining the oxygen stoichiometry. As mentioned before, an oxygen pressure (or partial pressure) in the atmosphere surrounding the ferrite material in excess of that of the desired ferrite product will oxidize the ferrous content of the ferrite material, whereas an oxygen deficiency will cause zinc ferrite to dissociate and zinc to be lost irreversibly. At any temperature in the temperature cycle used, the optimum oxygen pressure is a compromise between the minimum pressure required to prevent a significant loss of zinc and the maximum pressure tolerable to minimize oxidation of the ferrous ion.

Figure 2:
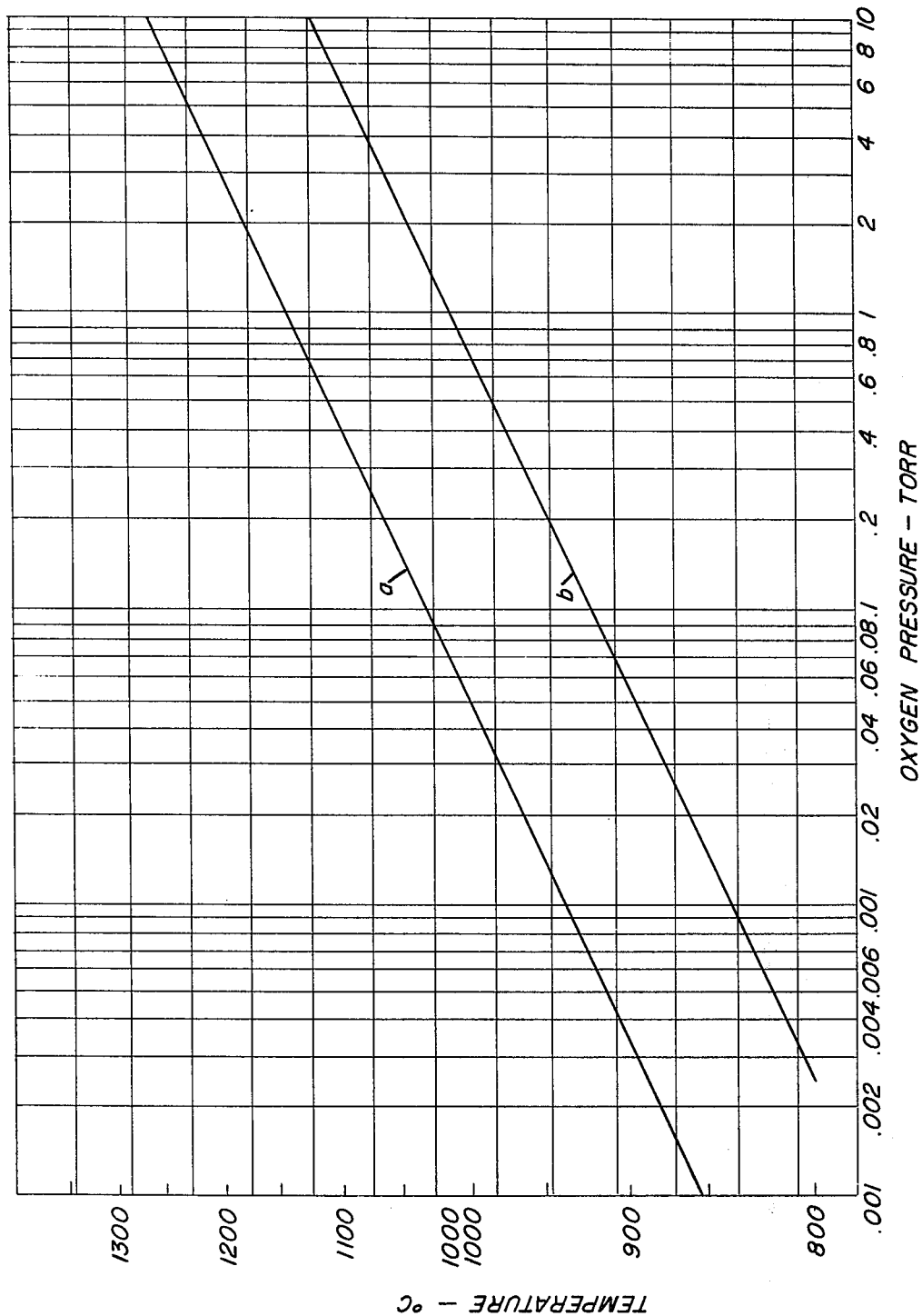
FIG. 2 shows plots of equilibrium oxygen pressure versus temperature as used for the atmosphere during sintering of manganese zinc ferrite and nickel zinc ferrite.

Plot $a$ of FIG. 2 shows a typical graphical representation of the relation between oxygen pressure (or oxygen partial pressure) and temperature that is followed for sintering manganese zinc ferrite according to this invention as applied to compositions A and B. The described function is useful for all manganese zinc ferrite of practical compositions and enables the operator to maintain the ferrous content of such ferrite at a level of 90 to 94% of the stoichiometric value without detectable loss of zinc. In the language of this description, such ferrite is deemed to be virtually stoichiometric.

Plot $b$ of FIG. 2 shows the corresponding relations used for nickel zinc ferrites containing a small amount of cobalt, e.g., for composition C described above.

A practical lower limit to the atmosphere control is set by the accuracy of controlling a very low concentration or flow rate. Commercial nitrogen for instance has a typical oxygen content of 0.002%, and can be considered as already oxidizing for manganese zinc ferrite at temperatures under 700°C. Requirements with respect to strict accuracy of atmosphere control are, however, minimized at low temperatures by the reduced rates of reaction and diffusion.

The atmosphere control can be effected by two different methods, both giving equally good results: one, by using pure oxygen under reduced pressure and adjusting such pressure in relation to the temperatures; or, two, by feeding a continuous stream of a non-reactive gas such as nitrogen at atmospheric pressure, admixing with said nitrogen stream controlled amounts of oxygen and adjusting the partial pressure of the oxygen in said admixed stream in accordance with the temperature. In either case the adjustments as to pressure, or partial pressure of oxygen are made on the basis of plotted curves such as shown on FIG. 2.

Sintering can be performed under simultaneous application of heat and pressure or hot pressing. Material processed by calcining, or pre-firing according to this invention is particularly suited for hot pressing since oxygen exchange is strongly impeded by the fact that the ferrite has to be confined in a die during hot pressing and because oxygen diffusion within the dense ferrite produced is limited to solid state diffusion.

In general, apparatus similar to that described in my pending application U.S. Ser. No. 59,512, filed July 30, 1970, can be used to carry out the sintering step that is a part of my present process for manufacturing ferrite bodies of reduced porosity improved mechanical and magnetic properties that are particularly desirable for use in magnetic recording heads and microwave devices. The best magnetic and mechanical properties are produced when ferrite powder of virtually correct oxygen stoichiometry is used as the starting material for the sintering step and the correct oxygen stoichiometry is preserved and maintained throughout the sintering step, or the combined sintering and pressing under high mechanical pressure, preferably with the ferrite, or mixed ferrite, powder held within a ceramic die of dense alumina or of silicon carbide, silicon nitride or other highly refractory but non-reactive material. Pressure is transferred from the pressure pads of the die assembly through a layer or layers of pulverulent refractory material rather than directly from the die pressure pads to the ferrite powder.

Finished ferrite parts are produced by sintering the preferred ferrite material at pressures within the range of from 5 to 500 kg/cm$^2$ and at temperatures within the range of from 1100° to 1400° C. A maximum sinter temperature of 1220° C. for 2 h while compressed in a ceramic die at a pressure of 100 kg/cm$^2$ imparts to a ferrite mixture, such as that of Composition A, the following properties:

| | | |
|---|---|---|
| $\mu i$ | 1200 | |
| $\mu i(f10)$ | 450 | |
| $f(Q1)$ | 8 | MHz |
| Hc | 0.2 | |
| Pv | 0.15% | |

The above values are substantially more favorable than those of commercial ferrite produced by prior art processes. Also the bend strength of polished samples (2700 kg/cm$^2$) is higher than that of porous ferrite by a factor of 2 to 4. The maximum porosity of finished ferrite parts produced by my process is smaller than 0.4%.

In general, ferrite materials that are particularly suited for manufacture in accordance with my invention have compositions expressed in mol percents of their metal oxide contents as follows:

| Manganese zinc ferrite | |
|---|---|
| Metal Oxides | Mol Percent |
| Fe$_2$O$_3$ (+Al$_2$O$_3$ as impurity) | 49 – 55 |
| MnO | 20 – 38 |
| ZnO | 12 – 28 |

The Al$_2$O$_3$ content is not an essential ingredient but may be present as an impurity due to attrition of the ball mill or balls if formed of alumina.

| Nickel zinc ferrite | |
|---|---|
| Metal Oxides | Mol Percent |
| Fe$_2$O$_3$ (+Al$_2$O$_3$ as impurity) | |
| NiO | 15 – 35 |
| ZnO | 15 – 35 |
| CoO | 0 – 2 |

Preferably, both the pre-firing, or calcining step, and the sintering step are carried out in temperature cycles wherein the pressure of the oxygen, whether total or partial pressure, is adjusted and maintained in relation to the temperature obtaining at a given instant during such temperature cycles so as to maintain the oxygen stoichiometry of the ferrite material. A plot such as that of the curves a and b of FIG. 2 serves as a guide line for the adjustment and maintenance of the proper oxygen pressure for a given temperatures at virtually the same level as that desired in the finished ferrite product.

It is to be understood that the foregoing only relates to exemplary embodiments of the invention and that numerous modifications, substitutions and deviations are possible without departing from the scope of the invention as defined in the following claims.

What is claimed is:

1. In a process for preparing manganese zinc ferrite powder, nickel zinc ferrite powder, or nickel zinc cobalt ferrite powder by calcining solid ferrite forming metal compounds to form said ferrite, cooling said ferrite and subsequently sintering said ferrite, the improvement which comprises (1) controlling the oxygen content of the ambient atmosphere during said calcining to form a ferrite having an oxygen content which is substantially stoichiometric, (2) cooling said ferrite by quenching in a liquid to strain and fracture said ferrite by thermal shock while maintaining said substantially stoichiometric oxygen content and (3) controlling the oxygen content of the ambient atmosphere through said sintering to maintain said substantially stoichiometric oxygen content of said ferrite.

2. A process according to claim 1 in which said ambient atmosphere contains oxygen gas and said oxygen content of said ferrite is maintained substantially stoichiometric by adjusting the pressure of said oxygen gas.

3. A process according to claim 2 in which said ambient atmosphere also contains a nonreactive gas with said oxygen gas.

4. A process according to claim 3 in which said nonreactive gas is nitrogen.

5. A process according to claim 1 in which said ferrite forming metal compounds are metal oxides.

6. A process according to claim 5 in which said ferrite is quenched by discharging it beneath the surface of water.

7. A process according to claim 6 in which said ferrite is milled after quenching and prior to sintering by attrition between alumina surfaces.

8. A process according to claim 7 in which said ferrite is milled in a water slurry to a maximum particle size of about 10 microns.

9. A process according to claim 1 in which said ambient atmosphere during calcining is a flowing stream of nitrogen having an oxygen content in the range of 0 to about 1%, by volume.

10. A process according to claim 1 in which said ferrite forming metal compounds are (1) Fe$_2$O$_3$, Mn$_2$O$_3$ and ZnO, (2) Fe$_2$O$_3$, MnCO$_3$ and ZnO or (3) Fe$_2$O$_3$, NiO, CoO and ZnO.

* * * * *

UNITED STATES PATENT AND TRADEMARK OFFICE
CERTIFICATE OF CORRECTION

PATENT NO. : 3,948,785
DATED : April 6, 1976
INVENTOR(S) : Jean Berchtold

It is certified that error appears in the above–identified patent and that said Letters Patent are hereby corrected as shown below:

Title page, below the title, change "[76]" to --[72]--.

Title page, below "Inventor" add, as a new line,

--[73] Assignee: Spin Physics Inc., San Diego, Calif.--.

Column 8, line 5, below "Mol Percent", add --47-50--.

Column 5, line 44, under "A", change "1000" to --1100--.

Signed and Sealed this

Thirtieth Day of November 1976

[SEAL]

Attest:

RUTH C. MASON
*Attesting Officer*

C. MARSHALL DANN
*Commissioner of Patents and Trademarks*